(12) United States Patent
Joung et al.

(10) Patent No.: US 12,552,886 B2
(45) Date of Patent: *Feb. 17, 2026

(54) OLEFIN-BASED POLYMER, FILM PREPARED THEREFROM, AND PREPARATION METHODS THEREFOR

(71) Applicant: HANWHA SOLUTIONS CORPORATION, Seoul (KR)

(72) Inventors: Ui Gap Joung, Daejeon (KR); Munhee Lee, Daejeon (KR); Sung Dong Kim, Daejeon (KR); Seongjae Lim, Daejeon (KR); Hye Ran Park, Daejeon (KR); Junho Seo, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 127 days.

This patent is subject to a terminal disclaimer.

(21) Appl. No.: 18/038,084

(22) PCT Filed: Nov. 11, 2021

(86) PCT No.: PCT/KR2021/016398
§ 371 (c)(1),
(2) Date: May 22, 2023

(87) PCT Pub. No.: WO2022/108233
PCT Pub. Date: May 27, 2022

(65) Prior Publication Data
US 2023/0416426 A1 Dec. 28, 2023

(30) Foreign Application Priority Data
Nov. 23, 2020 (KR) ........................ 10-2020-0157497

(51) Int. Cl.
C08F 210/16 (2006.01)
C08F 4/02 (2006.01)
C08F 4/76 (2006.01)

(52) U.S. Cl.
CPC ............ C08F 210/16 (2013.01); C08F 4/025 (2013.01); C08F 4/76 (2013.01); C08F 2410/04 (2013.01)

(58) Field of Classification Search
None
See application file for complete search history.

(56) References Cited

U.S. PATENT DOCUMENTS

2005/0159300 A1* 7/2005 Jensen ................... C08F 10/00
502/103
2013/0345377 A1 12/2013 Ker et al.
(Continued)

FOREIGN PATENT DOCUMENTS

CN 114746485 A 7/2022
EP 3 851 463 A1 7/2021
(Continued)

OTHER PUBLICATIONS

Communication issued Jan. 22, 2025 in Chinese Application No. 202180078726.5.
(Continued)

*Primary Examiner* — Eli D. Strah
(74) *Attorney, Agent, or Firm* — Sughrue Mion, PLLC

(57) ABSTRACT

The present invention relates to an olefin-based polymer, a film prepared therefrom, and preparation methods therefor. An olefin-based polymer according to an embodiment of the present invention has excellent processability, and a film prepared therefrom, particularly, a linear low density polyethylene film has excellent mechanical strength and heat sealability, in particular, low-temperature heat sealability.

15 Claims, 4 Drawing Sheets

(56) References Cited

U.S. PATENT DOCUMENTS

| | | | |
|---|---|---|---|
| 2019/0040167 A1* | 2/2019 | Holtcamp | C08F 210/16 |
| 2019/0127502 A1 | 5/2019 | Holtcamp et al. | |
| 2019/0144575 A1 | 5/2019 | Lue et al. | |
| 2019/0210340 A1 | 7/2019 | Ruiz et al. | |
| 2019/0284317 A1* | 9/2019 | Kwon | C08F 4/65904 |
| 2020/0071437 A1 | 3/2020 | Stevens et al. | |
| 2020/0231717 A1 | 7/2020 | Kim et al. | |
| 2023/0416427 A1* | 12/2023 | Lee | C08F 4/76 |

FOREIGN PATENT DOCUMENTS

| | | |
|---|---|---|
| JP | 2000-508367 A | 7/2000 |
| JP | 2015-113282 A | 6/2015 |
| JP | 2017-505374 A | 2/2017 |
| JP | 2019-507821 A | 3/2019 |
| JP | 2020-517780 A | 6/2020 |
| JP | 2020-117678 A | 8/2020 |
| KR | 10-2007-0098276 A | 10/2007 |
| KR | 10-2018-0071854 A | 6/2018 |
| KR | 10-2020-0044295 A | 4/2020 |
| KR | 10-2020-0117663 A | 10/2020 |
| WO | 2018/193327 A1 | 10/2018 |
| WO | 2019/089153 A1 | 5/2019 |
| WO | 2022/120321 A1 | 6/2022 |

OTHER PUBLICATIONS

International Search Report for PCT/KR2021/016398 dated Feb. 28, 2022.
Extended European Search Report dated Jan. 3, 2025 in Application 21895003.8.

* cited by examiner

[FIG. 1]
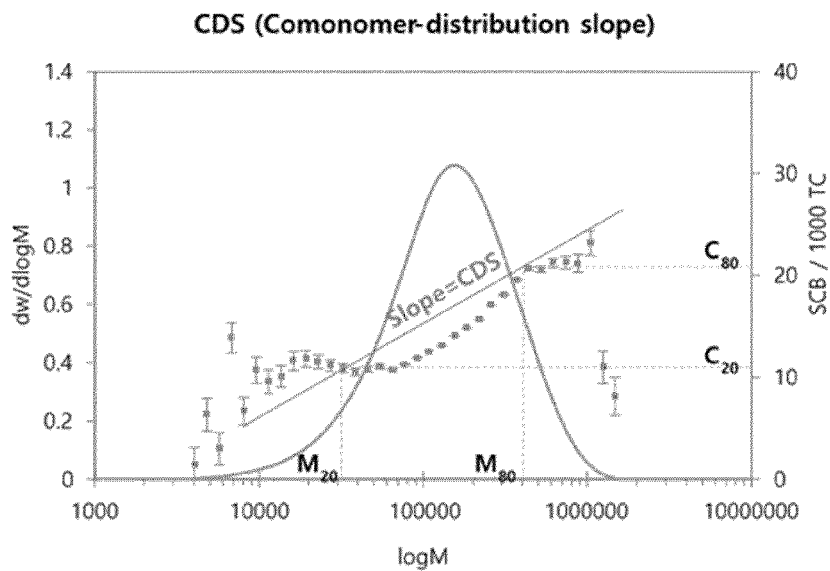
[FIG. 2]
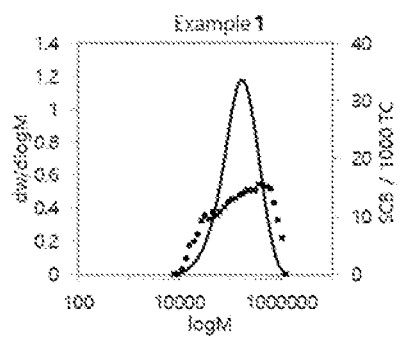
[FIG. 3]
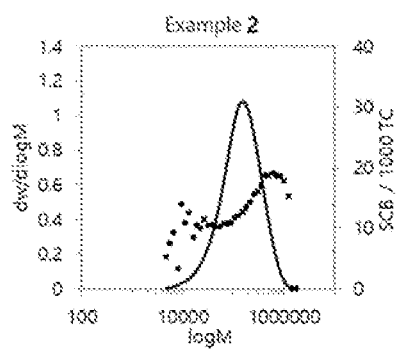

[FIG. 4]
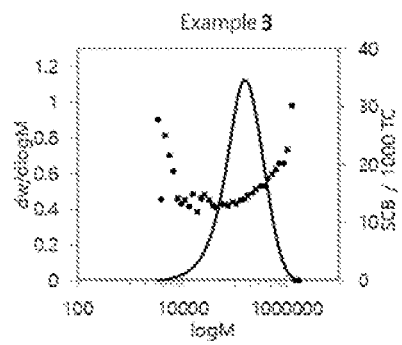
[FIG. 5]
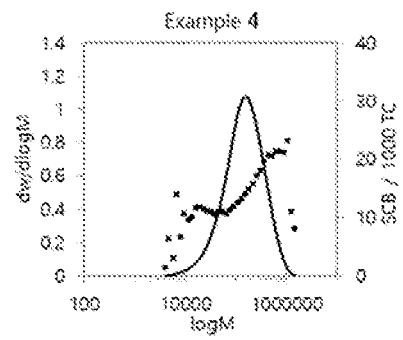
[FIG. 6]
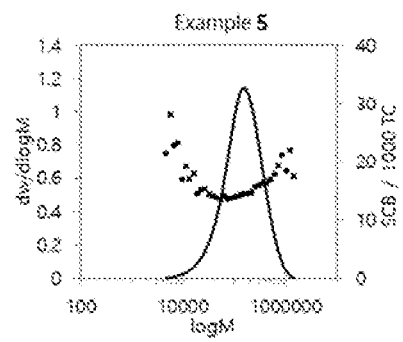

[FIG. 7]
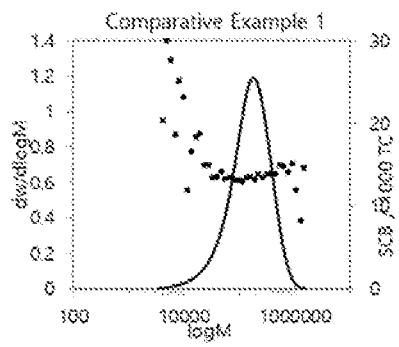
[FIG. 8]
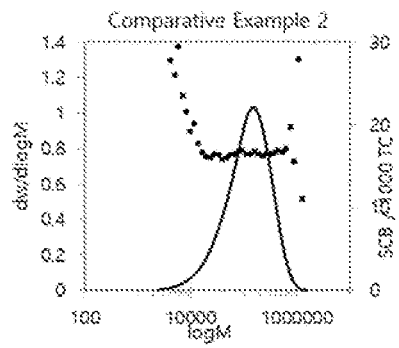
[FIG. 9]
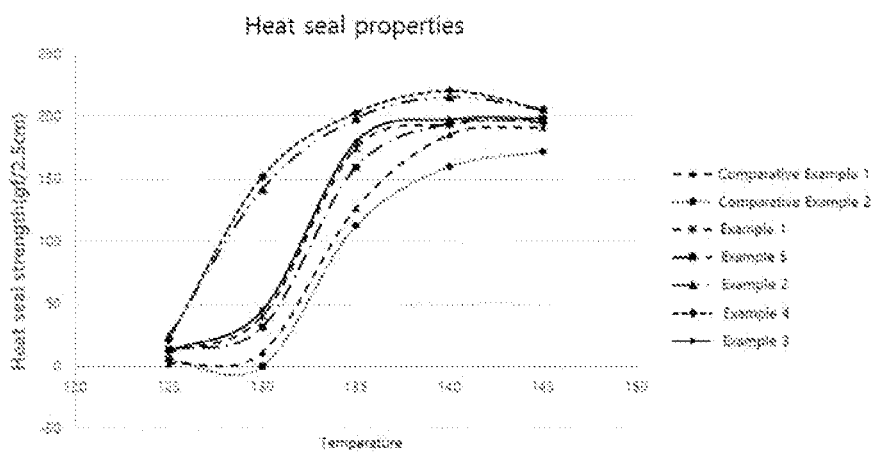

[FIG. 10]
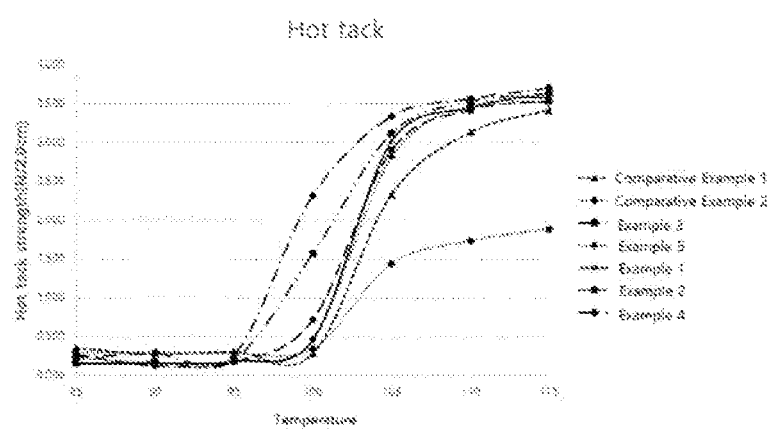

OLEFIN-BASED POLYMER, FILM PREPARED THEREFROM, AND PREPARATION METHODS THEREFOR

CROSS REFERENCE TO RELATED APPLICATIONS

This application is a National Stage of International Application No. PCT/KR2021/016398 filed Nov. 11, 2021, claiming priority based on Korean Patent Application No. 10-2020-0157497 filed Nov. 23, 2020.

TECHNICAL FIELD

The present invention relates to an olefin-based polymer, a film prepared therefrom, and a method for preparing the same. Specifically, the present invention relates to an olefin-based polymer having excellent processability, an olefin-based polymer film which is prepared therefrom and has excellent heat seal strength, in particular, excellent heat seal strength at a low temperature, and a method for preparing the same.

BACKGROUND ART

A metallocene catalyst which is one of the catalysts used in olefin polymerization, which is a compound in which a ligand such as cyclopentadienyl, indenyl, or cycloheptadienyl is coordinated to a transition metal or a transition metal halogen compound, has a sandwich structure as a basic form.

A Ziegler-Natta catalyst which is another catalyst used for polymerizing olefins has heterogeneous properties of an active site, since a metal component as an active site is dispersed on an inert solid surface; however, the metallocene catalyst is known as a single-site catalyst having identical polymerization properties in all active sites, since it is one compound having a certain structure. A polymer polymerized with the metallocene catalyst as such has a narrow molecular weight distribution, a uniform comonomer distribution, and copolymerization activity higher than the Ziegler Natta catalyst.

Meanwhile, a linear low-density polyethylene (LLDPE) is prepared by copolymerizing ethylene and α-olefin at a low pressure using a polymerization catalyst, has a narrow molecular weight distribution and a short chain branch (SCB) having a certain length, and does not have a long chain branch (LCB) in general. A film prepared with a linear low-density polyethylene has high breaking strength and elongation, and excellent tear strength, impact strength, and the like, together with general properties of polyethylene, and thus, is widely used in a stretch film, an overlap film, and the like to which it is conventionally difficult to apply low-density polyethylene or high-density polyethylene.

However, the linear low-density polyethylene prepared by a metallocene catalyst has poor processability due to a narrow molecular weight distribution, and a film prepared therefrom tends to have lowered heat seal properties.

Therefore, an olefin-based polymer which allows preparation of a film having excellent mechanical strength and heat seal properties, in particular, heat seal properties at a low temperature while having excellent processability, is being demanded.

DISCLOSURE

Technical Problem

An object of the present invention is to provide an olefin-based polymer which allows preparation of an olefin-based polymer film having excellent mechanical strength and heat seal properties, in particular, heat seal properties at a low temperature while having excellent processability.

Another object of the present invention is to provide an olefin-based polymer film which is prepared from the olefin-based polymer and has excellent mechanical strength and heat seal properties, in particular, heat seal properties at a low temperature.

Another object of the present invention is to provide a method for preparing the olefin-based polymer and the olefin-based polymer film.

Technical Solution

In one general aspect, an olefin-based polymer which has (1) a density of 0.910 to 0.940 g/cm³, preferably 0.910 to 0.925 g/cm³; (2) a melt index ($I_{2.16}$) of 0.5 to 2.0 g/10 min, preferably 0.8 to 1.5 g/10 min as measured with a load of 2.16 kg at 190° C.; (3) a ratio between a melt index ($I_{21.6}$) measured with a load of 21.6 kg and a melt index ($I_{2.16}$) measured with a load of 2.16 kg at 190° C. (melt flow ratio; MFR) of 20 to 60, preferably 20 to 50; and (4) a comonomer distribution slope (CDS) defined by the following Equation 1 of 3 or more, preferably 3 to 15 is provided:

$$CDS = (C_{80} - C_{20})/(\log M_{80} - \log M_{20}) \quad \text{[Equation 1]}$$

wherein $C_{20}$ and $C_{80}$ are comonomer contents at points where cumulative weight fractions are 20% and 80%, respectively, in a comonomer distribution, and $M_{20}$ and $M_{80}$ are molecular weights at points where cumulative weight fractions are 20% and 80%, respectively, in a comonomer distribution.

In a specific example of the present invention, the olefin-based polymer may be prepared by polymerizing an olefin-based monomer in the presence of a hybrid catalyst including: at least one first transition compound represented by the following Chemical Formula 1; and at least one second transition metal compound selected from a compound represented by the following Chemical Formula 2 and a compound represented by the following Chemical Formula 3:

[Chemical Formula 1]

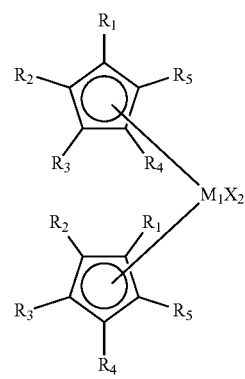

-continued

[Chemical Formula 2]

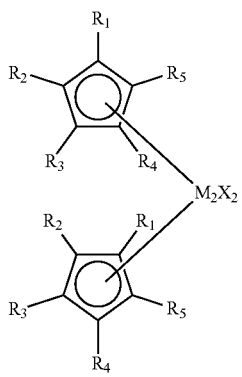

[Chemical Formula 3]

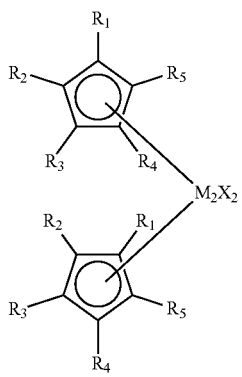

wherein $M_1$ and $M_2$ are different from each other and independently of each other titanium (Ti), zirconium (Zr), or hafnium (Hf), X is independently of each other halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, or $C_{6-20}$ arylamido, and $R_1$ to $R_{10}$ are independently of one another hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, but $R_1$ to $R_{10}$ may be independently of each other connected to an adjacent group to form a substituted or unsubstituted saturated or unsaturated $C_{4-20}$ ring.

In a specific example of the present invention, $M_1$ and $M_2$ may be different from each other and be zirconium or hafnium, respectively, X may be halogen or $C_{1-20}$ alkyl, respectively, and $R_1$ to $R_{10}$ may be hydrogen, substituted or unsubstituted $C_{1-20}$ alkyl, substituted or unsubstituted $C_{1-20}$ alkenyl, or substituted or unsubstituted $C_{6-20}$ aryl, respectively.

In a preferred specific example of the present invention, $M_1$ may be hafnium, $M_2$ may be zirconium, and X may be chlorine or methyl.

In a preferred specific example of the present invention, the first transition metal compound may be at least one of transition metal compounds represented by the following Chemical Formulae 1-1 and 1-2, and the second transition metal compound may be at least one of transition metal compounds represented by the following Chemical Formulae 2-1, 2-2, and 3-1:

[Chemical Formula 1-1]

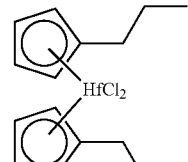

[Chemical Formula 1-2]

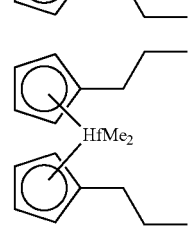

[Chemical Formula 2-1]

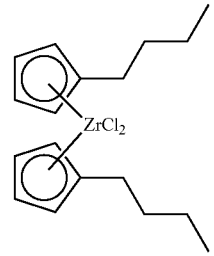

[Chemical Formula 2-2]

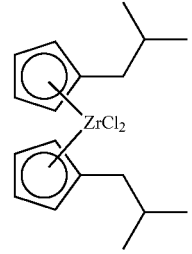

[Chemical Formula 3-1]

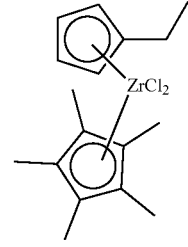

wherein Me is a methyl group.

In a specific example of the present invention, a mole ratio of the first transition metal compound to the second transition metal compound is in a range of 100:1 to 1:100.

In a specific example of the present invention, the catalyst may include at least one cocatalyst selected from the group consisting of a compound represented by the following Chemical Formula 4, a compound represented by the following Chemical Formula 5, and a compound represented by the following Chemical Formula 6:

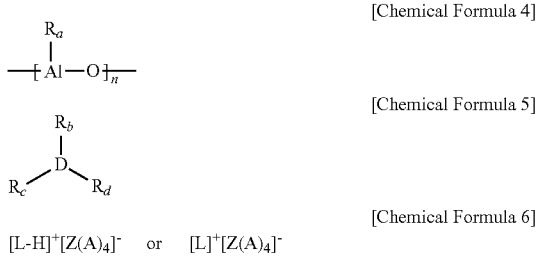

[Chemical Formula 4]

[Chemical Formula 5]

[Chemical Formula 6]

[L-H]⁺[Z(A)₄]⁻ or [L]⁺[Z(A)₄]⁻ wherein n is an integer of 2 or more, $R_a$ is a halogen atom, a $C_{1-20}$ hydrocarbon group, or a $C_{1-20}$ hydrocarbon group substituted with halogen, D is aluminum (Al) or boron (B), $R_b$, $R_c$, and $R_d$ are independently of one another a halogen atom, a $C_{1-20}$ hydrocarbon group, a $C_{1-20}$ hydrocarbon group substituted with halogen, or a $C_{1-20}$ alkoxy group, L is a neutral or cationic Lewis base, $[L-H]^+$ and $[L]^+$ are a Bronsted acid, Z is a group 13 element, and A is independently of each other a substituted or unsubstituted $C_{6-20}$ aryl group or a substituted or unsubstituted $C_{1-20}$ alkyl group.

In a specific example of the present invention, the catalyst may further include a carrier which supports a transition metal compound, a cocatalyst compound, or both of them.

In a preferred specific example of the present invention, the carrier may include at least one selected from the group consisting of silica, alumina, and magnesia.

Here, a total amount of the hybrid transition metal compound supported on the carrier may be 0.001 to 1 mmol based on 1 g of the carrier, and a total amount of the cocatalyst compound supported on the carrier may be 2 to 15 mmol based on 1 g of the carrier.

In a specific example of the present invention, the olefin-based polymer may be a copolymer of an olefin-based polymer and an olefin-based comonomer. Specifically, the olefin-based monomer may be ethylene, and the olefin-based comonomer may be at least one selected from the group consisting of propylene, 1-butene, 1-pentene, 4-methyl-1-pentene, 1-hexene, 1-heptene, 1-octene, 1-decene, 1-undecene, 1-dodecene, 1-tetradecene, and 1-hexadecene. Preferably, the olefin-based polymer may be a linear low-density polyethylene in which the olefin-based polymer is ethylene and the olefin-based monomer is 1-hexene.

In another general aspect, a method for preparing an olefin-based polymer includes: polymerizing an olefin-based monomer in the presence of a hybrid catalyst including: at least one first transition metal compound represented by Chemical Formula 1; and at least one second transition metal compound selected from the compound represented by Chemical Formula 2 and the compound represented by Chemical Formula 3, thereby obtaining an olefin-based polymer, wherein the olefin-based polymer has (1) a density of 0.910 to 0.940 g/cm³, preferably 0.910 to 0.925 g/cm³; (2) a melt index ($I_{2.16}$) of 0.5 to 2.0 g/10 min, preferably 0.8 to 1.5 g/10 min as measured with a load of 2.16 kg at 190° C.; (3) a ratio between a melt index ($I_{21.6}$) measured with a load of 21.6 kg and a melt index ($I_{2.16}$) measured with a load of 2.16 kg at 190° C. (melt flow ratio; MFR) of 20 to 60, preferably 20 to 50; and (4) a comonomer distribution slope (CDS) defined by Equation 1 of 3 or more, preferably 3 to 15.

In a specific example of the present invention, polymerization of the olefin-based monomer may be gas phase polymerization, specifically, the polymerization of the olefin-based monomer may be performed in a gas phase fluidized bed reactor.

In another general aspect, an olefin-based polymer film which is prepared from the olefin-based polymer, and has a heat seal strength of 30 gf/2.5 cm or more, preferably 30 to 150 gf/2.5 cm as measured under the conditions of 0.2 bar, 1.5 seconds, and 130° C., a heat seal strength of 150 gf/2.5 cm or more, preferably 150 to 210 gf/2.5 cm as measured under the conditions of 0.2 bar, 1.5 seconds, and 135° C., a hot tack strength at 100° C. of 0.45 N/2 cm or more, preferably 0.45 to 2.5 N/2 cm, and a hot tack strength at 110° C. of 3.45 N/2 cm or more, preferably 3.45 to 3.57 N/2 cm is provided.

In a specific example of the present invention, the film may be at least one selected from the group consisting of a stretch film, an overlap film, a laminated film, a silage wrap, and an agricultural film.

In still another general aspect, a method for preparing an olefin-based polymer film includes (a) polymerizing an olefin-based monomer in the presence of a hybrid catalyst including: at least one first transition metal compound represented by Chemical Formula 1; and at least one second transition metal compound selected from the compound represented by Chemical Formula 2 and the compound represented by Chemical Formula 3, thereby obtaining an olefin-based polymer; and (b) molding the olefin-based polymer to obtain a film: wherein the olefin-based polymer film has a heat seal strength of 30 gf/2.5 cm or more, preferably 30 to 150 gf/2.5 cm as measured under the conditions of 0.2 bar, 1.5 seconds, and 130° C., a heat seal strength of 150 gf/2.5 cm or more, preferably 150 to 210 gf/2.5 cm as measured under the conditions of 0.2 bar, 1.5 seconds, and 135° C., a hot tack strength at 100° C. of 0.45 N/2 cm or more, preferably 0.45 to 2.5 N/2 cm, and a hot tack strength at 110° C. of 3.45 N/2 cm or more, preferably 3.45 to 3.57 N/2 cm.

Advantageous Effects

The olefin-based polymer according to an embodiment of the present invention has excellent processability, and the film prepared therefrom, in particular, a linear low-density polyethylene film has excellent mechanical strength and heat seal properties, in particular, heat seal properties at a low temperature.

DESCRIPTION OF DRAWINGS

FIG. 1 is a GPC-FTIR graph for describing a method for measuring a CDS defined by Equation 1.

FIGS. 2 to 6 are GPC-FTIR graphs for measuring a CDS of olefin-based polymers of Examples 1 to 5, respectively.

FIGS. 7 and 8 are GPC-FTIR graphs for measuring a CDS of olefin-based polymers of Comparative Examples, respectively.

FIG. 9 is a graph showing heat seal strength of Examples 1 to 5 and Comparative Examples 1 and 2.

FIG. 10 is a graph showing hot tack strength of Examples 1 to 5 and Comparative Examples 1 and 2.

BEST MODE

Hereinafter, the present invention will be described in more detail.

Olefin-Based Polymer

According to an embodiment of the present invention, an olefin-based polymer having (1) a density of 0.910 to 0.940 g/cm³; (2) a melt index ($I_{2.16}$) of 0.5 to 2.0 g/10 min as measured with a load of 2.16 kg at 190° C.; (3) a ratio between a melt index ($I_{21.6}$) measured with a load of 21.6 kg and a melt index ($I_{2.16}$) measured with a load of 2.16 kg at 190° C. (melt flow ratio; MFR) of 20 to 60; and (4) a comonomer distribution slope (CDS) defined by Equation 1 of 3 or more is provided.

In a specific example of the present invention, the olefin-based polymer has a density of 0.910 to 0.940 g/cm³. Preferably, the olefin-based polymer may have a density of 0.910 to 0.925 g/cm³.

In a specific example of the present invention, the olefin-based polymer may have a melt index ($I_{2.16}$) of 0.5 to 2.0 g/10 min as measured with a load of 2.16 kg at 190° C. Preferably, the olefin-based polymer may have a melt index of 0.8 to 1.5 g/10 min as measured with a load of 2.16 kg at 190° C.

In a specific example of the present invention, the olefin-based polymer may have a ratio between a melt index ($I_{21.6}$) measured with a load of 21.6 kg and a melt index ($I_{2.16}$) measured with a load of 2.16 kg at 190° C. (melt flow ratio; MFR) of 20 to 60. Preferably, the olefin-based polymer may have an MFR of 20 to 50.

In a specific example of the present invention, the olefin-based polymer may have a comonomer distribution slope (CDS) defined by the following Equation 1 of 3 or more. Preferably, the olefin-based polymer may have the CDS of 3 to 15.

$$CDS = (C_{80} - C_{20})/(\log M_{80} - \log M_{20})$$ [Equation 1]

wherein $C_{20}$ and $C_{80}$ are comonomer contents at points where cumulative weight fractions are 20% and 80%, respectively, in a comonomer distribution, and $M_{20}$ and $M_{80}$ are molecular weights at points where cumulative weight fractions are 20% and 80%, respectively, in a comonomer distribution.

The CDS of the olefin-based polymer represents a slope of a comonomer content to a molecular weight at points where cumulative weight fractions are 20% and 80%, respectively, in a comonomer distribution graph. As the CDS of the olefin-based polymer is higher, a copolymer is concentrated on a polymer chain having a higher molecular weight, so that mechanical strength and heat seal properties may be excellent.

Here, the comonomer distribution of the olefin-based polymer may be continuously measured with the molecular weight and the molecular weight distribution of the polymer, using GPC-FTIR equipment.

In a specific example of the present invention, the olefin-based polymer may be prepared by polymerizing an olefin-based monomer in the presence of a hybrid catalyst including: at least one first transition compound represented by the following Chemical Formula 1; and at least one second transition metal compound selected from a compound represented by the following Chemical Formula 2 and a compound represented by the following Chemical Formula 3:

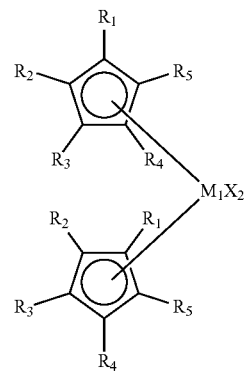

[Chemical Formula 1]

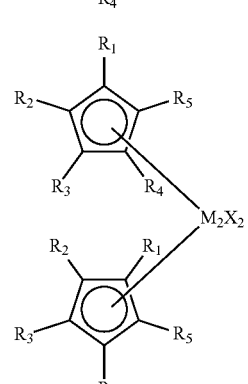

[Chemical Formula 2]

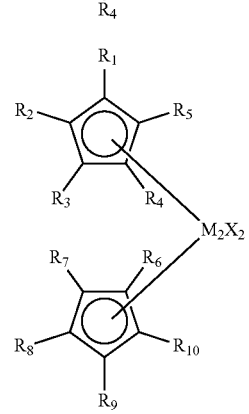

[Chemical Formula 3]

In Chemical Formulae 1 to 3, $M_1$ and $M_2$ are different from each other and independently of each other titanium (Ti), zirconium (Zr), or hafnium (Hf). Specifically, $M_1$ and $M_2$ may be different from each other and be zirconium or hafnium, respectively. Preferably, $M_1$ may be hafnium and $M_2$ may be zirconium.

X is independently of each other halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, or $C_{6-20}$ arylamido. Specifically, X may be halogen or $C_{1-20}$ alkyl, respectively. Preferably, X may be chlorine or methyl.

$R_1$ to $R_{10}$ are independently of one another hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, in which $R_1$ to $R_{10}$ may be independently of each other connected to an adjacent group to form a substituted or unsubstituted saturated or unsaturated $C_{4-20}$ ring. Specifically, $R_1$ to $R_{10}$ may be hydrogen, substituted or unsubstituted $C_{1-20}$ alkyl, substituted or unsubstituted $C_{1-20}$ alkenyl, or substituted or unsubstituted $C_{6-20}$ aryl, respectively.

In a specific example of the present invention, $M_1$ and $M_2$ may be different from each other and be zirconium or hafnium, respectively, X may be halogen or $C_{1-20}$ alkyl, and $R_1$ to $R_{10}$ may be hydrogen, substituted or unsubstituted $C_{1-20}$ alkyl, substituted or unsubstituted $C_{1-20}$ alkenyl, or substituted or unsubstituted $C_{6-20}$ aryl, respectively.

In a preferred specific example of the present invention, $M_1$ may be hafnium, $M_2$ may be zirconium, and X may be chlorine or methyl.

In a preferred specific example of the present invention, the first transition metal compound may be at least one of transition metal compounds represented by the following Chemical Formulae 1-1 and 1-2, and the second transition metal compound may be at least one of transition metal compounds represented by the following Chemical Formulae 2-1, 2-2, and 3-1:

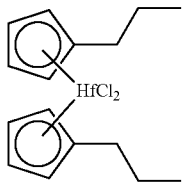

[Chemical Formula 1-1]

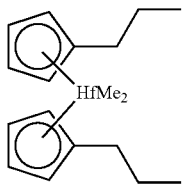

[Chemical Formula 1-2]

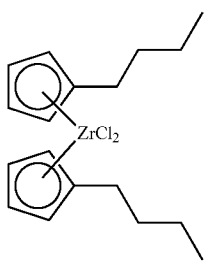

[Chemical Formula 2-1]

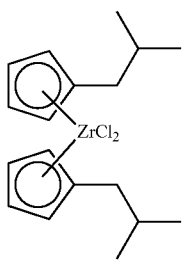

[Chemical Formula 2-2]

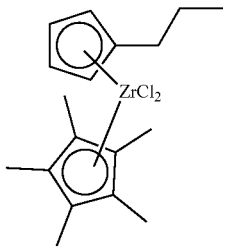

[Chemical Formula 3-1]

wherein Me is a methyl group.

In a specific example of the present invention, a mole ratio of the first transition metal compound to the second transition metal compound is in a range of 100:1 to 1:100. Preferably, a mole ratio of the first transition metal compound to the second transition metal compound is in a range of 50:1 to 1:50. Preferably, a mole ratio of the first transition metal compound to the second transition metal compound is in a range of 10:1 to 1:10.

In a specific example of the present invention, the catalyst may include at least one cocatalyst compound selected from the group consisting of a compound represented by the following Chemical Formula 4, a compound represented by the following Chemical Formula 5, and a compound represented by the following Chemical Formula 6:

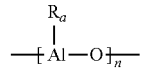

[Chemical Formula 4]

wherein n is an integer of 2 or more, $R_a$ is a halogen atom, $C_{1-20}$ hydrocarbon, or $C_{1-20}$ hydrocarbon substituted with halogen. Specifically, $R_a$ may be methyl, ethyl, n-butyl, or isobutyl.

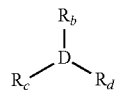

[Chemical Formula 5]

wherein D is aluminum (Al) or boron (B), and $R_b$, $R_c$, and $R_d$ are independently of one another a halogen atom, a $C_{1-20}$ hydrocarbon group, a $C_{1-20}$ hydrocarbon group substituted with halogen, or a $C_{1-20}$ alkoxy group. Specifically, when D is aluminum (Al), $R_b$, $R_c$, and $R_d$ may be independently of one another methyl or isobutyl, and when D is boron (B), $R_b$, $R_c$, and $R_d$ may be pentafluorophenyl, respectively.

$$[L-H]^+[Z(A)_4]^- \text{ or } [L]^+[Z(A)_4]^-$$ [Chemical Formula 6]

wherein L is a neutral or cationic Lewis base, $[L-H]^+$ and $[L]^+$ are a Bronsted acid, Z is a group 13 element, and A is independently of each other a substituted or unsubstituted $C_{6-20}$ aryl group or a substituted or unsubstituted $C_{1-20}$ alkyl group. Specifically, $[L-H]^+$ may be dimethylanilinium cation, $[Z(A)_4]^-$ may be $[B(C_6F_5)_4]^-$, and $[L]^+$ may be $[(C_6H_5)_3C]^+$.

Specifically, an example of the compound represented by Chemical Formula 4 includes methylaluminoxane, ethylaluminoxane, isobutylaluminoxane, butylaluminoxane, and the like, and is preferably methylaluminoxane, but is not limited thereto.

An example of the compound represented by Chemical Formula 5 includes trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, and the like, and is preferably trimethylaluminum, triethylaluminum, and triisobutylaluminum, but is not limited thereto.

An example of the compound represented by Chemical Formula 6 includes triethylammoniumtetraphenylboron, tributylammoniumtetraphenylboron, trimethylammoniumtetraphenylboron, tripropylammoniumtetraphenylboron, trimethylammoniumtetra(p-tolyl) boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliniumtetraphenylboron, N,N-diethylaniliniumtetrapentafluorophenylboron, diethylammoniumtetrapentafluorophenylboron, triphenylphosphoniumtetraphenylboron, trimethylphosphoniumtetraphenylboron, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetrapentafluorophenylaluminum, N,N-diethylaniliniumtetraphenylaluminum, N,N-diethylaniliniumtetrapentafluorophenylaluminum, diethylammoniumtetrapentatetraphenylaluminum, triphenylphosphoniumtetraphenylaluminum, trimethylphosphoniumtetraphenylaluminum, tripropylammoniumtetra(p-tolyl)boron, triethylammoniumtetra(o,p-dimethylphenyl) boron, tributylammoniumtetra(p-trifluoromethylphenyl) boron, triphenylcarboniumtetra(p-trifluoromethylphenyl) boron, triphenylcarboniumtetrapentafluorophenylboron, and the like.

In a specific example of the present invention, the catalyst may further include a carrier which supports a transition metal compound, a cocatalyst compound, or both of them. Specifically, the carrier may support both the transition metal compound and the cocatalyst compound.

Here, the carrier may include a material containing a hydroxyl group on the surface, and preferably, may use a material having highly reactive hydroxyl group and siloxane group which is dried to remove moisture from the surface. For example, the carrier may include at least one selected from the group consisting of silica, alumina, and magnesia. Specifically, silica, silica-alumina, silica-magnesia, and the like which are dried at a high temperature may be used as the carrier, and these may usually contain oxide, carbonate, sulfate, and nitrate components such as $Na_2O$, $K_2CO_3$, $BaSO_4$, and $Mg(NO_3)_2$. In addition, these may include carbon, zeolite, magnesium chloride, and the like. However, the carrier is not limited thereto, and is not particularly limited as long as it may support a transition metal compound and a cocatalyst compound.

The carrier may have an average particle size of 10 to 250 µm, preferably 10 to 150 µm, and more preferably 20 to 100 µm.

The carrier may have a micropore volume of 0.1 to 10 cc/g, preferably 0.5 to 5 cc/g, and more preferably 1.0 to 3.0 cc/g.

The carrier may have a specific surface area of 1 to 1,000 $m^2$/g, preferably 100 to 800 $m^2$/g, and more preferably 200 to 600 $m^2$/g.

In a preferred specific example of the present invention, the carrier may be silica. Here, a drying temperature of the silica may be 200 to 900° C. The drying temperature may be 300 to 800° C., and more preferably 400 to 700° C. When the drying temperature is lower than 200° C., silica has too much moisture so that the moisture on the surface reacts with the cocatalyst compound, and when the drying temperature is higher than 900° C., the structure of the carrier may collapse.

A concentration of a hydroxyl group in dried silica may be 0.1 to 5 mmol/g, preferably 0.7 to 4 mmol/g, and more preferably 1.0 to 2 mmol/g. When the concentration of the hydroxyl group is less than 0.1 mmol/g, the supported amount of the cocatalyst compound is lowered, and when the concentration is more than 5 mmol/g, the catalyst component becomes inactive.

The total amount of the transition metal compound supported on the carrier may be 0.001 to 1 mmol based on 1 g of the carrier. When a ratio between the transition metal compound and the carrier satisfies the above range, appropriate supported catalyst activity is shown, which is advantageous in terms of the activity maintenance of a catalyst and economic feasibility.

The total amount of the cocatalyst compound supported on the carrier may be 2 to 15 mmol based on 1 g of the carrier. When the ratio of the cocatalyst compound and the carrier satisfies the above range, it is advantageous in terms of the activity maintenance of a catalyst and economic feasibility.

The carrier may be one or two or more. For example, both the transition metal compound and the cocatalyst compound may be supported on one carrier, and each of the transition metal compound and the cocatalyst compound may be supported on two or more carriers. In addition, only one of the transition metal compound and the cocatalyst compound may be supported on the carrier.

As a method for supporting the transition metal compound and/or the cocatalyst compound which may be used in the catalyst for olefin polymerization, a physical adsorption method or a chemical adsorption method may be used.

For example, the physical adsorption method may be a method of bringing a solution in which a transition metal compound is dissolved into contact with a carrier and then drying, a method of bringing a solution in which a transition metal compound and a cocatalyst compound are dissolved into contact with a carrier and then drying, a method of bringing a solution in which a transition metal compound is dissolved into contact with a carrier and then drying to prepare a carrier on which the transition metal compound is supported, separately bringing a solution in which a cocatalyst compound is dissolved into contact with a carrier and then drying to prepare a carrier on which the cocatalyst compound is supported, and then mixing them, or the like.

The chemical adsorption method may be a method of first supporting a cocatalyst compound on the surface of a carrier and then supporting a transition metal compound on the cocatalyst compound, a method of binding a functional group (for example, a hydroxyl group (—OH) on the surface of silica, in the case of silica) on the surface of a carrier and a catalyst compound covalently.

In a specific example of the present invention, the olefin-based polymer may be a homopolymer of an olefin-based monomer or a copolymer of olefin-based monomer and comonomer. Preferably, the olefin-based polymer is a copolymer of an olefin-based monomer and an olefin-based comonomer.

Here, the olefin-based monomer may be at least one selected from the group consisting of $C_{2-20}$ α-olefin, $C_{1-20}$ diolefin, $C_{3-20}$ cycloolefin, and $C_{3-20}$ cyclodiolefin.

For example, the olefin-based monomer may be ethylene, propylene, 1-butene, 1-pentene, 4-methyl-1-pentene, 1-hexene, 1-heptene, 1-octene, 1-decene, 1-undecene, 1-dodecene, 1-tetradecene, or 1-hexadecene, and the olefin-based polymer may be a homopolymer including only one or a copolymer including two or more of the olefin-based monomers exemplified above.

In an exemplary embodiment, the olefin-based polymer may be a copolymer of ethylene and $C_{3-20}$ α-olefin. Preferably, the olefin-based polymer may be a linear low-density polyethylene in which the olefin-based monomer is ethylene and the olefin-based comonomer is 1-hexene.

In this case, the content of ethylene is preferably 55 to 99.9 wt %, and more preferably 90 to 99.9 wt %. The content of the α-olefin-based comonomer is preferably 0.1 to 45 wt %, and more preferably 0.1 to 10 wt %.

Method for Preparing Olefin-Based Polymer

According to an embodiment of the present invention, a method for preparing an olefin-based polymer including: obtaining an olefin-based polymer by polymerizing an olefin-based monomer in the presence of a hybrid catalyst including: at least one first transition compound represented by the following Chemical Formula 1; and at least one second transition metal compound selected from a compound represented by the following Chemical Formula 2 and a compound represented by the following Chemical Formula 3, is provided:

[Chemical Formula 1]

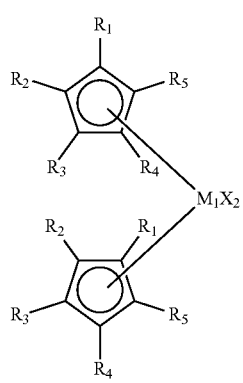

[Chemical Formula 2]

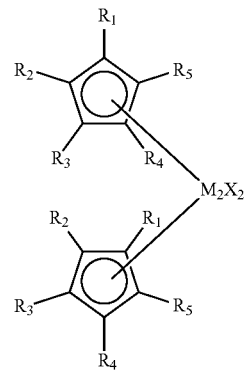

[Chemical Formula 3]

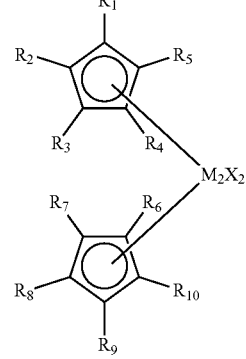

wherein $M_1$, $M_2$, X, and $R_1$ to $R_{10}$ are as defined above in the item of "olefin-based polymer".

As described above, the olefin-based polymer prepared by the preparation method according to an embodiment of the present invention has (1) a density of 0.910 to 0.940 g/cm³, preferably 0.910 to 0.925 g/cm³; (2) a melt index ($I_{2.16}$) of 0.5 to 2.0 g/10 min, preferably 0.8 to 1.5 g/10 min as measured with a load of 2.16 kg at 190° C.; (3) a ratio between a melt index ($I_{21.6}$) measured with a load of 21.6 kg and a melt index ($I_{2.16}$) measured with a load of 2.16 kg at 190° C. (melt flow ratio; MFR) of 20 to 60, preferably 20 to 50; and (4) a comonomer distribution slope (CDS) defined by the following Equation 1 of 3 or more, preferably 3 to 15:

$$CDS=(C_{80}-C_{20})/\log M_{80}-\log M_{20})$$ [Equation 1]

wherein $C_{20}$, $C_{80}$, $M_{20}$, and $M_{80}$ are as defined above in the item of "olefin-based polymer".

In a specific example of the present invention, the olefin-based polymer may be polymerized by a polymerization reaction such as free radical, cationic, coordination, condensation, and addition polymerization, but is not limited thereto.

In an exemplary embodiment of the present invention, the olefin-based polymer may be prepared by a gas phase polymerization method, a solution polymerization method, a slurry polymerization method, or the like. Preferably, the polymerization of the olefin-based monomer may be gas phase polymerization, specifically, the polymerization of the olefin-based monomer may be performed in a gas phase fluidized bed reactor.

When the olefin-based polymer is prepared by a solution polymerization method or a slurry polymerization method, an example of the solvent to be used may include a $C_{5-12}$ aliphatic hydrocarbon solvent such as pentane, hexane, heptane, nonane, decane, and isomers thereof; an aromatic hydrocarbon solvent such as toluene and benzene; a hydrocarbon solvent substituted with a chlorine atom such as dichloromethane and chlorobenzene; and a mixture thereof, but is not limited thereto.

Olefin-Based Polymer Film

According to an embodiment of the present invention, an olefin-based polymer film which is prepared by molding the olefin-based polymer described above, and has a heat seal strength of 30 gf/2.5 cm or more as measured under the conditions of 0.2 bar, 1.5 seconds, and 130° C., a heat seal strength of 150 gf/2.5 cm or more as measured under the conditions of 0.2 bar, 1.5 seconds, and 135° C., a hot tack strength at 100° C. of 0.45 N/2 cm or more, and a hot tack strength at 110° C. of 3.45 N/2 cm or more is provided.

In a specific example of the present invention, the olefin-based polymer film has a heat seal strength of 30 gf/2.5 cm or more as measured under the conditions of 0.2 bar, 1.5 seconds, and 130° C. in accordance with ASTM F88. Preferably, the olefin-based polymer film may have the heat seal strength (130° C.) of 30 to 150 gf/2.5 cm.

In a specific example of the present invention, the olefin-based polymer film has a heat seal strength of 150 gf/2.5 cm or more as measured under the conditions of 0.2 bar, 1.5 seconds, and 135° C. in accordance with ASTM F88. Preferably, the olefin-based polymer film may have the heat seal strength (135° C.) of 150 to 210 gf/2.5 cm.

In a specific example of the present invention, the olefin-based polymer film may have the hot tack strength at 100° C. of 0.45 N/2 cm or more as measured in accordance with ASTM F1921. Preferably, the olefin-based polymer film may have the hot tack strength at 100° C. of 0.45 to 2.5 N/2 cm.

In a specific example of the present invention, the olefin-based polymer film may have the hot tack strength at 110° C. of 3.45 N/2 cm or more as measured in accordance with ASTM F1921. Preferably, the olefin-based polymer film may have the hot tack strength at 110° C. of 3.45 to 3.57 N/2 cm.

The olefin-based polymer film according to an embodiment of the present invention has excellent mechanical properties and heat seal properties, by including the olefin-based polymer described above. It is understood that since the olefin-based polymer described above has a relatively large molecular weight distribution and there are more short chain branches in a high molecular weight component, the mechanical strength and the heat seal properties at a low temperature of the olefin-based polymer film prepared therefrom are excellent.

In a specific example of the present invention, the olefin-based polymer film may be effectively used as a stretch film, an overlap film, a laminated film, a silage warp, an agricultural film, and the like.

Method for Preparing Olefin-Based Polymer Film

According to one embodiment of the present invention, a method for preparing an olefin-based polymer film including: (a) polymerizing an olefin-based monomer in the presence of a hybrid catalyst including: at least one first transition metal compound represented by the following Chemical Formula 1; and at least one second transition metal compound selected from the compound represented by the following Chemical Formula 2 and the compound represented by the following Chemical Formula 3, thereby obtaining an olefin-based polymer; and (b) molding the olefin-based polymer to obtain a film: wherein the olefin-based polymer film has a heat seal strength of 30 gf/2.5 cm or more, preferably 30 to 150 gf/2.5 cm as measured under the conditions of 0.2 bar, 1.5 seconds, and 130° C., a heat seal strength of 150 gf/2.5 cm or more, preferably 150 to 210 gf/2.5 cm as measured under the conditions of 0.2 bar, 1.5 seconds, and 135° C., a hot tack strength at 100° C. of 0.45 N/2 cm or more, preferably 0.45 to 2.5 N/2 cm, and a hot tack strength at 110° C. of 3.45 N/2 cm or more, preferably 3.45 to 3.57 N/2 cm.

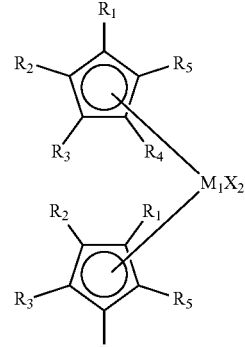

[Chemical Formula 1]

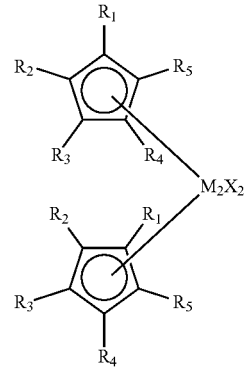

[Chemical Formula 2]

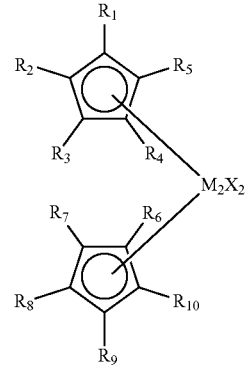

[Chemical Formula 3]

wherein $M_1$, $M_2$, X, and $R_1$ to $R_{10}$ are as defined above in the item of "olefin-based polymer".

In step (a), the transition metal compound, the olefin-based monomer, and the polymerization method are as described in the items of "olefin-based polymer" and "method for preparing olefin-based polymer".

In step (b), the molding method of an olefin-based polymer film according to an embodiment of the present invention is not particularly limited, and may use a molding method known in the art to which the present invention belongs. For example, the olefin-based polymer described above may be processed by a common method such as blown film molding, extrusion molding, or casting molding, thereby preparing an olefin-based polymer film. Among them, blown film molding is most preferred.

The characteristics of the olefin-based polymer film obtained by the method for preparing an olefin-based polymer film according to an embodiment of the present invention are as described above in the item of "olefin-based polymer film".

BEST MODE FOR CARRYING OUT THE INVENTION

Examples

Hereinafter, the present invention will be specifically described through the following examples. However, the following examples are only illustrative of the present invention, and do not limit the scope of the present invention.

Preparation Example

The transition metal compound of Chemical Formula 1-1 (bis(n-propylcyclopentadienyl) hafnium dichloride) and the transition metal compound of Chemical Formula 2-1 (bis (n-butylcyclopentadienyl) zirconium dichloride) were purchased from TCI, the transition metal compound of Chemical Formula 1-2 (dimethylbis(n-propylcyclopentadienyl) hafnium dichloride), the transition metal compound of Chemical Formula 2-2 (bis(i-butylcyclopentadienyl) zirconium dichloride), and the transition metal compound of Chemical Formula 3-1 ((pentamethylcyclopentadienyl) (n-propylcyclopentadienyl) zirconium dichloride) were purchased from MCN, and these were used without an additional purification process.

Preparation Example 1

892 g of a 10% toluene solution of methylaluminoxane was added to 4.47 g of the transition metal compound of Chemical Formula 1-1 and 1.67 g of the transition metal compound of Chemical Formula 2-1, and the solution was stirred at room temperature for 1 hour. The solution after the reaction was added to 200 g of silica (XPO-2402), 1.5 L of toluene was further added, and stirring was performed at 70° C. for 2 hours. The supported catalyst was washed with 500 mL of toluene, and was dried overnight at 60° C. under vacuum to obtain 280 g of a supported catalyst in powder form.

Preparation Example 2

277 g of a supported catalyst was obtained in the same manner as in Preparation Example 1, except that 4.47 g of the transition metal compound of Chemical Formula 1-1 and 1.67 g of the transition metal compound of Chemical Formula 2-2 were used.

Preparation Example 3

280 g of a supported catalyst was obtained in the same manner as in Preparation Example 1, except that 4.47 g of the transition metal compound of Chemical Formula 1-1 and 1.68 g of the transition metal compound of Chemical Formula 3-1 were used.

Preparation Example 4

282 g of a supported catalyst was obtained in the same manner as in Preparation Example 1, except that 4.07 g of the transition metal compound of Chemical Formula 1-2 and 1.67 g of the transition metal compound of Chemical Formula 2-2 were used.

Preparation Example 5

279 g of a supported catalyst was obtained in the same manner as in Preparation Example 1, except that 4.07 g of the transition metal compound of Chemical Formula 1-2 and 1.68 g of the transition metal compound of Chemical Formula 3-1 were used.

Examples 1 to 5

Ethylene/1-hexene copolymers were prepared in the presence of the supported catalysts, which were obtained in Preparation Examples 1 to 5, respectively, using a gas phase fluidized bed reactor. The ethylene partial pressure of the reactor was maintained at about 15 kg/cm$^2$, and the polymerization temperature was maintained at 80 to 90° C.

The polymerization conditions of the examples are shown in the following Table 1.

TABLE 1

| Catalyst | Example 1 Preparation Example 1 | Example 2 Preparation Example 2 | Example 3 Preparation Example 3 | Example 4 Preparation Example 4 | Example 5 Preparation Example 5 |
|---|---|---|---|---|---|
| Polymerization temperature (° C.) | 85.1 | 84.6 | 84.3 | 84.8 | 85.2 |
| Superficial gas velocity (m/s) | 53.2 | 53.1 | 53.4 | 53.2 | 53.2 |
| Production amount (kg/h) | 10.1 | 9.9 | 10.0 | 9.7 | 10.3 |
| Ethylene pressure (kg/cm$^2$) | 14.18 | 14.12 | 14.13 | 14.21 | 14.13 |
| Hydrogen/ethylene mole ratio | 0.03 | 0.03 | 0.05 | 0.03 | 0.05 |
| 1-Hexene/ethylene mole ratio | 1.32 | 1.23 | 1.37 | 1.17 | 1.47 |
| Catalytic activity (gPE/gCat) | 3,489 | 3,171 | 3,780 | 5,185 | 4,802 |
| Volume density (g/cc) | 0.413 | 0.426 | 0.434 | 0.415 | 0.433 |

Comparative Examples 1 and 2

For comparison, linear low-density polyethylenes M1810HN (density: 0.9180 g/cm$^3$, melt index: 1.0 g/10 min; Comparative Example 1) and M2010HN (density: 0.9200 g/cm$^3$, melt index: 1.0 g/10 min; Comparative Example 2) from Hanwha Solutions were used.

Test Example

The physical properties of the olefin-based polymer of the above examples were measured by the following methods and criteria. The results are shown in Table 2.

(1) Density
Measured according to ASTM D 1505.
(2) Melt Index and Melt Index Ratio (MFR)
The melt index was measured with a load of 21.6 kg and a load of 2.16 kg, respectively, at 190° C. in accordance with ASTM D1238, and the ratio ($MI_{21.6}/MI_{2.16}$) was calculated.
(3) Comonomer Distribution Slope (CDS)
Measured at 170° C. using gel permeation chromatography-FTIR (GPC-FTIR).
(4) Melting Temperature
A differential scanning calorimeter (DSC, device name: DSC 2920, manufacturer: TA Instrument) was used to measure the melting point of a polymer. Specifically, the polymer was heated up to 200° C., the temperature was maintained for 5 minutes, cooled back to 20° C., and then raised, and at this time, temperature rise rate and drop rate were adjusted to 20° C./min, respectively.

TABLE 2

|  | Unit | Example 1 | Example 2 | Example 3 | Example 4 | Example 5 | Comparative Example 1 | Comparative Example 2 |
|---|---|---|---|---|---|---|---|---|
| Density | g/cm$^3$ | 0.9180 | 0.9186 | 0.9205 | 0.9184 | 0.9187 | 0.9202 | 0.9178 |
| Melt index | g/10 min | 1.21 | 0.91 | 0.91 | 1.04 | 0.99 | 1.08 | 1.00 |
| MER | — | 20.1 | 21.0 | 21.0 | 20.1 | 22.0 | 16.11 | 33.24 |
| Mw | g/mol | 200363 | 198243 | 198243 | 199661 | 199178 | 200729 | 169034 |
| Mw/Mn | — | 1.88 | 2.2 | 2.2 | 2.07 | 2.23 | 2.12 | 2.52 |
| CDS | — | 5.04 | 5.57 | 9.05 | 3.64 | 11.3 | 1.26 | 0.211 |
| Melting temperature | ° C. | 120 | 120 | 119 | 121.0 | 119.2 | 117.2 | 108.3 |

The resins of Examples 1 to 5 and Comparative Examples 1 and 2 were prepared into films having a thickness of 50 μm, respectively, through a 40 mm blown film extruder (40 mm Φ screw, 75 mm Φ die, 2 mm die gap). Here, the extrusion conditions were set to C1/C2/C3/A/D1/D2=160/165/170/175/180/180° C., a screw speed of 60 rpm, and a blow-up ratio (BUR) of 2.

The physical properties of the olefin-based polymer films of the examples and the comparative examples were measured by the following methods and criteria. The results are shown in Table 3.

(5) Haze
The film was molded into a standard of a thickness of 50 μm and the haze was measured in accordance with ASTM D 1003. At this time, the measurement was performed five times per one specimen, and their average value was taken.
(6) Transparency
The film was molded into a standard of a thickness of 50 μm and the haze was measured in accordance with ASTM D 1003. At this time, the measurement was performed five times per one specimen, and their average value was taken.
(7) Heat Seal Strength
Measured according to ASTM F 88.
(8) Hot Tack Strength
Measured according to ASTM F 1921.

TABLE 3

|  | Unit | Example 1 | Example 2 | Example 3 | Example 4 | Example 5 | Comparative Example 1 | Comparative Example 2 |
|---|---|---|---|---|---|---|---|---|
| Haze | % | 5.43 | 5.99 | 5.99 | 7.18 | 5.99 | 8.72 | 4.66 |
| Transparency | % | 95.43 | 99.57 | 99.57 | 99.53 | 99.57 | 98.0 | 99.3 |
| Heat seal strength (0.2 bar, 1.5 seconds, 130° C.) | gf/2.5 cm | 40.0 | 45 | 141.9 | 152.1 | 45 | 11.1 | 0 |

TABLE 3-continued

| | Unit | Example 1 | Example 2 | Example 3 | Example 4 | Example 5 | Comparative Example 1 | Comparative Example 2 |
|---|---|---|---|---|---|---|---|---|
| Heat seal strength (0.2 bar, 1.5 seconds, 135° C.) | gf/ 2.5 cm | 194.0 | 198 | 215.8 | 220.7 | 198 | 140.0 | 160.1 |
| Hot tack strength (100° C.) | N/2 cm | 0.45 | 1.56 | 1.79 | 2.32 | 1.56 | 0.28 | 0.34 |
| Hot tack strength (110° C.) | N/2 cm | 3.45 | 3.53 | 3.79 | 3.57 | 3.53 | 3.13 | 1.73 |

INDUSTRIAL APPLICABILITY

The olefin-based polymer according to the specific example of the present invention has excellent processability, and the olefin-based polymer film prepared therefrom, specifically a linear low-density polyethylene film, has excellent mechanical strength and heat seal properties, in particular, heat seal properties at a low temperature.

The invention claimed is:

1. An olefin-based polymer having (1) a density of 0.910 to 0.940 g/cm$^3$; (2) a melt index ($I_{2.16}$) of 0.5 to 2.0 g/10 min as measured with a load of 2.16 kg at 190° C.; (3) a ratio between a melt index ($I_{21.6}$) measured with a load of 21.6 kg and a melt index ($I_{2.16}$) measured with a load of 2.16 kg at 190° C. (melt flow ratio; MFR) of 20 to 60; and (4) a comonomer distribution slope (CDS) defined by the following Equation 1 of 3 or more, wherein the olefin-based polymer is prepared by polymerizing an olefin-based monomer in the presence of a hybrid catalyst supported on a carrier including: at least one first transition metal compound represented by the following Chemical Formula 1; and at least one second transition metal compound selected from the group consisting of a compound represented by the following Chemical Formula 2 and a compound represented by the following Chemical Formula 3, wherein the first transition metal compound is at least one selected from the group consisting of transition metal compounds represented by the following Chemical Formulae 1-1 and 1-2; and the second transition metal compound is at least one selected from the group consisting of transition metal compounds represented by the following Chemical Formulae 2-1, 2-2, and 3-1, wherein the carrier includes at least one selected from the group consisting of silica, alumina, and magnesia:

$$CDS=(C_{80}-C_{20})/(\log M_{80}-\log M_{20}) \qquad \text{[Equation 1]}$$

wherein $C_{20}$ and $C_{80}$ are comonomer contents at points where cumulative weight fractions are 20% and 80%, respectively, in a comonomer distribution, and $M_{20}$ and $M_{80}$ are molecular weights at points where cumulative weight fractions are 20% and 80%, respectively, in a comonomer distribution,

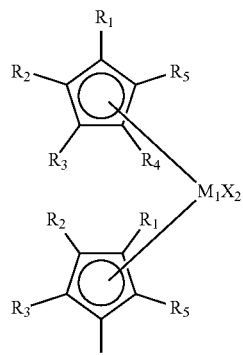

[Chemical Formula 1]

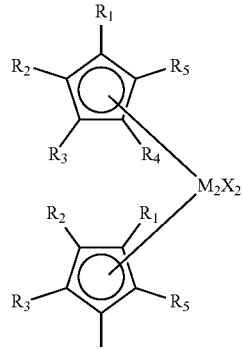

[Chemical Formula 2]

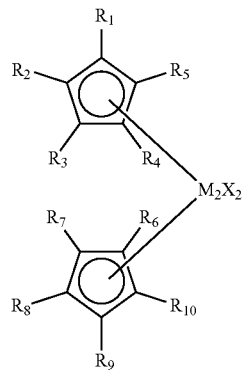

[Chemical Formula 3]

wherein $M_1$ and $M_2$ are different from each other and independently of each other titanium (Ti), zirconium (Zr), or hafnium (Hf), X is independently of each other halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, or $C_{6-20}$ arylamido, and $R_1$ to $R_{10}$ are independently of one another hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl, $C_{1-20}$ alkyl, substituted or unsubstituted C1-20 heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, but $R_1$ to $R_{10}$ may be independently of each other connected to an adjacent group to form a substituted or unsubstituted saturated or unsaturated $C_{4-20}$ ring,

[Chemical Formula 1-1]

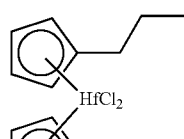

[Chemical Formula 1-2]

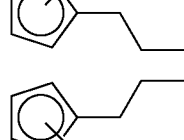

[Chemical Formula 2-1]

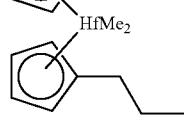

[Chemical Formula 2-2]

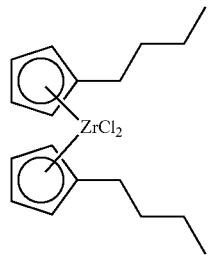

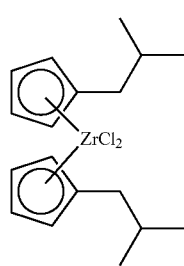

[Chemical Formula 3-1]

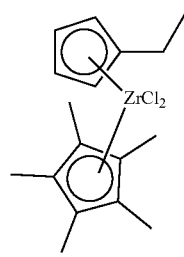

wherein Me is a methyl group.

2. The olefin-based polymer of claim 1, wherein the olefin-based polymer has (1) the density of 0.910 to 0.925 g/cm³; (2) the melt index of 0.8 to 1.5 g/10 min as measured with a load of 2.16 kg at 190° C.; (3) the MFR of 20 to 50; and (4) the CDS of 3 to 15.

3. The olefin-based polymer of claim 1, wherein a mole ratio of the first transition metal compound to the second transition metal compound is in a range of 100:1 to 1:100.

4. The olefin-based polymer of claim 1, wherein the hybrid catalyst includes at least one cocatalyst compound selected from the group consisting of a compound represented by the following Chemical Formula 4, a compound represented by the following Chemical Formula 5, and a compound represented by the following Chemical Formula 6:

[Chemical Formula 4]

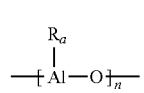

[Chemical Formula 5]

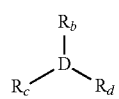

[Chemical Formula 6]

wherein n is an integer of 2 or more, $R_a$ is a halogen atom, a $C_{1-20}$ hydrocarbon group, or a $C_{1-20}$ hydrocarbon group substituted with halogen, D is aluminum (Al) or boron (B), $R_b$, $R_c$, and $R_d$ are independently of one another a halogen atom, a $C_{1-20}$ hydrocarbon group, a $C_{1-20}$ hydrocarbon group substituted with halogen, or a $C_{1-20}$ alkoxy group, L is a neutral or cationic Lewis base, $[L-H]^+$ and $[L]^+$ are a Bronsted acid, Z is a group 13 element, and A is independently of each other a substituted or unsubstituted $C_{6-20}$ aryl group or a substituted or unsubstituted $C_{1-20}$ alkyl group.

5. The olefin-based polymer of claim 4, wherein the hybrid catalyst further includes a carrier which supports the first transition metal compound, the second transition metal compound, the cocatalyst compound, or all of them.

6. The olefin-based polymer of claim 1, wherein a total amount of the hybrid catalyst first and second transition metal compounds supported on the carrier is 0.001 to 1 mmol based on 1 g of the carrier, and a total amount of the cocatalyst compound supported on the carrier is 2 to 15 mmol based on 1 g of the carrier.

7. The olefin-based polymer of claim 1, wherein the olefin-based polymer is a copolymer of the olefin-based monomer and an olefin-based comonomer.

8. The olefin-based polymer of claim 7, wherein the olefin-based monomer is ethylene, and the olefin-based comonomer is one or more selected from the group consisting of propylene, 1-butene, 1-pentene, 4-methyl-1-pentene, 1-hexene, 1-heptene, 1-octene, 1-decene, 1-undecene, 1-dodecene, 1-tetradecene, and 1-hexadecene.

9. The olefin-based polymer of claim 8, wherein the olefin-based polymer is a linear low-density polyethylene in which the olefin-based monomer is ethylene and the olefin-based comonomer is 1-hexene.

10. A method for preparing an olefin-based polymer, the method comprising: polymerizing an olefin-based monomer in the presence of a hybrid catalyst supported on a carrier including: at least one first transition metal compound represented by the following Chemical Formula 1; and at least one second transition metal compound selected from the group consisting of a compound represented by the following Chemical Formula 2 and a compound represented by the following Chemical Formula 3, wherein the first transition metal compound is at least one selected from the group consisting of transition metal compounds represented by the following Chemical Formulae 1-1 and 1-2; and the second transition metal compound is at least one selected from the group consisting of transition metal compounds represented by the following Chemical Formulae 2-1, 2-2, and 3-1, wherein the carrier includes at least one selected from the group consisting of silica, alumina, and magnesia, thereby obtaining an olefin-based polymer, wherein the olefin-based polymer has (1) a density of 0.910 to 0.940 g/cm$^3$; (2) a melt index ($I_{2.16}$) of 0.5 to 2.0 g/10 min as measured with a load of 2.16 kg at 190° C.; (3) a ratio between a melt index ($I_{21.6}$) measured with a load of 21.6 kg and a melt index ($I_{2.16}$) measured with a load of 2.16 kg at 190° C. of 20 to 60; and (4) a comonomer distribution slope (CDS) defined by Equation 1 of 3 or more:

[Chemical Formula 1]

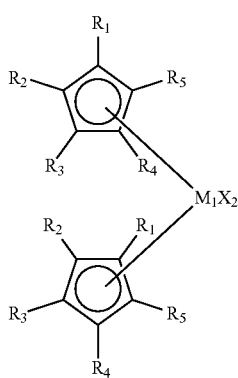

[Chemical Formula 2]

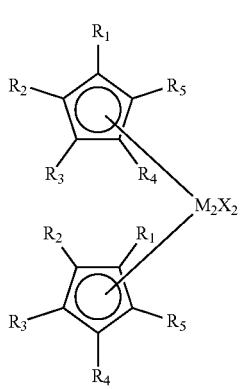

[Chemical Formula 3]

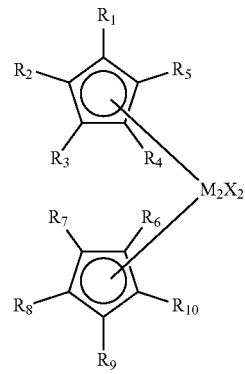

$CDS = (C_{80} - C_{20})/(\log M_{80} - \log M_{20})$ wherein $M_1$ and $M_2$ are different from each other and independently of each other titanium (Ti), zirconium (Zr), or hafnium (Hf), X is independently of each other halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, or $C_{6-20}$ arylamido, and $R_1$ to $R_{10}$ are independently of one another hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, but $R_1$ to $R_{10}$ may be independently of each other connected to an adjacent group to form a substituted or unsubstituted saturated or unsaturated $C_{4-20}$ ring,

[Chemical Formula 1-1]

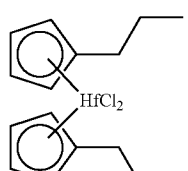

[Chemical Formula 1-2]

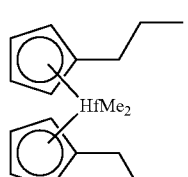

[Chemical Formula 2-1]

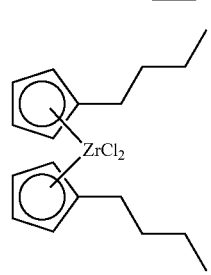

[Chemical Formula 2-2]

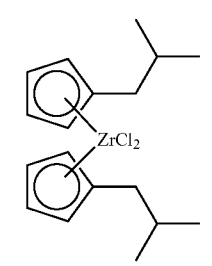

[Chemical Formula 3-1]

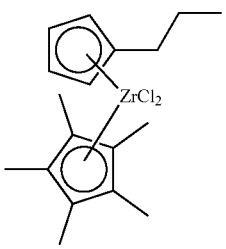

wherein Me is a methyl group.

11. The method for preparing an olefin-based polymer of claim 10, wherein the polymerization of the olefin-based monomer is gas phase polymerization.

12. An olefin-based polymer film which is prepared from the olefin-based polymer of claim 1, and has a heat seal strength of 30 gf/2.5 cm or more as measured under the conditions of 0.2 bar, 1.5 seconds, and 130° C., a heat seal strength of 150 gf/2.5 cm or more as measured under the conditions of 0.2 bar, 1.5 seconds, and 135° C., a hot tack strength at 100° C. of 0.45 N/2 cm or more, and a hot tack strength at 110° C. of 3.45 N/2 cm or more.

13. The olefin-based polymer film of claim 12, wherein the film has a heat seal strength of 30 to 150 gf/2.5 cm as measured under the conditions of 0.2 bar, 1.5 seconds, and 130° C., a heat seal strength of 150 to 210 gf/2.5 cm as measured under the conditions of 0.2 bar, 1.5 seconds, and 135° C., a hot tack strength at 100° C. of 0.45 to 2.5 N/2 cm or more, and a hot tack strength at 110° C. of 3.45 to 3.57 N/2 cm or more.

14. The olefin-based polymer film of claim 13, wherein the film is at least one selected from the group consisting of a stretch film, an overlap film, a laminated film, a silage wrap, and an agricultural film.

15. A method for preparing an olefin-based polymer film, the method comprising: (a) polymerizing an olefin-based monomer in the presence of a hybrid catalyst including: at least one first transition metal compound represented by the following Chemical Formula 1; and at least one second transition metal compound selected from the group consisting of a compound represented by the following Chemical Formula 2 and a compound represented by the following Chemical Formula 3, thereby obtaining an olefin-based polymer; and (b) molding the olefin-based polymer to obtain a film, wherein the olefin-based polymer film has a heat seal strength of 30 gf/2.5 cm or more as measured under the conditions of 0.2 bar, 1.5 seconds, and 130° C., a heat seal strength of 150 gf/2.5 cm or more as measured under the conditions of 0.2 bar, 1.5 seconds, and 135° C., a hot tack strength at 100° C. of 0.45 N/2 cm or more, and a hot tack strength at 110° C. of 3.45 N/2 cm or more:

[Chemical Formula 1]

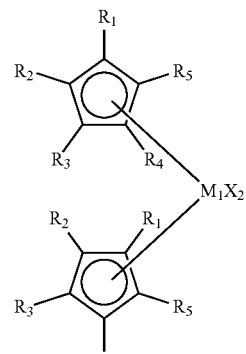

[Chemical Formula 2]

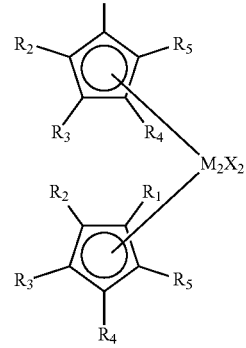

[Chemical Formula 3]

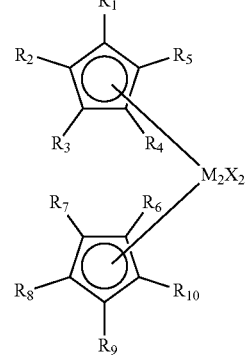

wherein $M_1$ and $M_2$ are different from each other and independently of each other titanium (Ti), zirconium (Zr), or hafnium (Hf), X is independently of each other halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, or $C_{6-20}$ arylamido, and $R_1$ to $R_{10}$ are independently of one another hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, but $R_1$ to $R_{10}$ may be independently of each other connected to an adjacent group to form a substituted or unsubstituted saturated or unsaturated $C_{4-20}$ ring, wherein $C_{20}$ and $C_{80}$ are comonomer contents at points where cumulative weight fractions are 20% and 80%, respectively, in a comonomer distribution, and $M_{20}$ and $M_{80}$ are molecular weights at points where cumulative weight fractions are 20% and 80%, respectively, in a comonomer distribution.

* * * * *